United States Patent [19]

Morrill

[11] 4,045,698

[45] Aug. 30, 1977

[54] SMALL AIR GAP MOTOR

[76] Inventor: Wayne J. Morrill, 3448 S. Washington Road, Fort Wayne, Ind. 46804

[21] Appl. No.: 682,453

[22] Filed: May 3, 1976

Related U.S. Application Data

[63] Continuation of Ser. No. 419,619, Nov. 28, 1973, abandoned.

[51] Int. Cl.² .............................................. H02K 17/00
[52] U.S. Cl. ..................................... 310/166; 310/90
[58] Field of Search .......................... 310/166, 172, 90

[56] References Cited

U.S. PATENT DOCUMENTS 1,884,140  10/1932  Nickle .................................. 310/172
2,993,131  7/1961  Trevitt .................................. 310/90

Primary Examiner—Harold Broome
Attorney, Agent, or Firm—Gust, Irish, Jeffers & Rickert

[57] ABSTRACT

An electric motor having a rotor member and a stator member which define an air gap from about 0.001 inch to about 0.006 inch in width, the ratio of air gap width to rotor diameter being from about 0.0009 to about 0.005.

7 Claims, 2 Drawing Figures

SMALL AIR GAP MOTOR

This application is a continuation of application Ser. No. 419,619, filed Nov. 28, 1973, and now abandoned.

BACKGROUND OF THE INVENTION

1. Field of the Invention

This invention relates generally to electric motors, and more particularly to unit bearing, fractional horsepower motors having an unusually small air gap.

2. Description of the Prior Art

Unit or single-bearing, shaded pole, single phase, alternatingcurrent motors are well known and are commonly used in air moving applications, a typical unit bearing motor construction being shown in U.S. Pat. No. 3,293,729 to the present applicant. Such conventional fractional horsepower, unit bearing motors have incorporated air gaps of about 0.009 or 0.010 inch, or more; to the best of the present applicant's knowledge, air gaps less than 0.008 inch have not heretofore been employed in such motors.

It has long been recognized that in the absence of losses, a decrease in air gap width with corresponding decrease in reluctance of the magnetic circuit will result in increased motor performance and efficiency. Resistance primarily limits the output in small shaded pole motors and thus, since the predominate current in such motors is magnetizing current, a decrease in the air gap width will result in a corresponding decrease in the input current and a proportionately greater decrease in copper loss ($I^2R$) thus, copper (or aluminum, as the case may be) and iron can be reduced, with consequent saving in cost and reduction in motor size, to bring the loss back to its original value, or alternatively with the same copper and iron configuration, locked rotor current and torque are increased to provide a "stiffer" motor.

While the potential advantages of reduced air gaps have been appreciated, the present applicant, and to the best of his knowledge other motor engineers, predicted that further reduction in air gap width beyond the widths currently employed would cause greatly increased pole face and tooth pulsation losses which would outweigh the advantages of the smaller excitation required by the smaller air gap. More particularly, as the air gap is made smaller, stator pole face and rotor tooth face losses increase due to the presence in the pole and tooth faces of magnetic flux of high space frequency which produces eddy-current and hysteresis losses of shallow penetration. It has been found that the magnetic flux from the rotor has ripples or harmonics creating 50 to 100 times as many poles as stator poles and further, the stator flux itself produces ripples or harmonics in the stator teeth.

I have found, most unexpectedly and surprisingly, that the use of extremely small air gaps, i.e., down to 0.001 inch, does not result in the aggravated tooth face and pole face losses I had predicted, while on the contrary that these previously unheard of small air gaps provide a very great improvement in performance and efficiency and thus afford a substantial reduction in overall cost.

I am aware that a miniature, two-bearing motor and motor alternator set was at one time provided for aircraft autopilot application. That instrument-type machine employed miniature ball bearings and was constructed with "white room" techniques to exceedingly accurate tolerances. The rotor members of those machines had an outside diameter on the order of one quarter inch with an air gap not less than 0.005 inch; however, the ratio of air gap width to rotor diameter was at least 0.020.

SUMMARY OF THE INVENTION

The invention, in its broader aspects, provides an electric motor having a stator core member with inwardly extending polar projections having inner ends defining a bore, and a rotor member rotatably mounted in the bore and defining radial air gaps therewith, the air gaps respectively having a radial width of from about 0.001 inch to about 0.006 inch, the ratio of airgap width to rotor diameter being about 0.0009 to about 0.005.

It is accordingly an object of the invention to provide an improved electric motor having an unusually small air gap.

Another object of the invention is to provide an improved electric motor having improved performance and efficiency.

A further object of the invention is to provide an improved unit bearing fractional horsepower motor having very small air gaps.

The above-mentioned and other features and objects of this invention and the manner of attaining them will become more apparent and the invention itself will be best understood by reference to the following description of an embodiment of the invention taken in conjunction with the accompanying drawings.

DESCRIPTION OF THE PREFERRED EMBODIMENT

Figure 1:
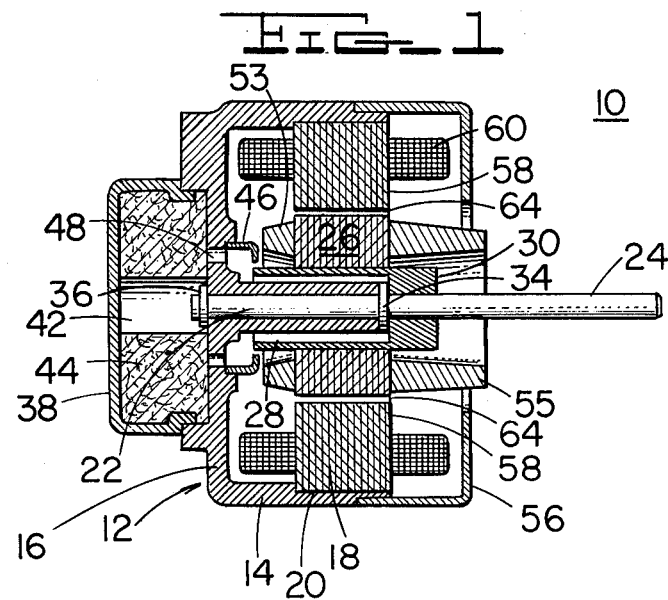
FIG. 1 is a side cross-sectional view showing a unit bearing, shaded pole, alternating current fractional horsepower motor incorporating the invention.

Referring now to FIG. 1 of the drawing, there is shown a conventional unit bearing, shaded pole, single phase, fractional horsepower alternating current induction motor, generally indicated at 10. Motor 10 includes a housing or frame 12 having side wall 14 and end wall 16. Stator core member 18 formed of a stacked plurality of relatively thin laminations of magnetic material is seated in rabbet 20 formed in the inner surface of side wall 14 of housing 12.

Bearing post 22 extends coaxially from end wall 16 of housing 12 into the cavity formed by side wall 14. Shaft 24 is rotatably journalled in bearing post 22. Rotor member 26 formed of a stacked plurality of relatively thin laminations of magnetic material is mounted on sleeve portion 28 of mounting member 30 secured to shaft 24, as by a shrink-fit. End bump cushioning washer 34 is positioned between the end of bearing post 22 and mounting member 30, and end play of shaft 24 and rotor member 26 is restrained by retaining washer 36 on shaft 24 bearing against the outer surface of end wall 16 of housing 12.

End cap 38 is secured to end wall 16 of housing 12 and defines cavity 42 therewith. Lubricant absorbent material 44 is positioned in cavity 42 and feeds lubricant to bearing 22. Cupshaped member 46 is attached to the inner surface of side wall 16 of housing 12 and surrounds the inner end of sleeve 28. Lubricant which passes along the journal surface of shaft 24 and into the space between bearing 22 and sleeve 28, is thrown outwardly into cup-shaped member 46 and returns to lubricant absorbent material 44 through openings 48 in end wall 16 of housing 12.

Squirrel cage bars 50 are positioned in slots 52 in rotor member 26 adjacent outer surface 54 thereof and are joined by end rings 53, 55, squirrel cage bars 50 and end rings 53, 55 conventionally being formed of die-cast aluminum.

Stator core member 18 comprises an annular yoke portion 57 having a plurality of salient pole pieces 58 extending radially inwardly therefrom. Typically, motor 10 will have two, four, or six equally angularly spaced pole pieces 58 thereby providing a two, four, or six pole motor. Field windings 60 are positioned on pole pieces 58. Cover member 56 is attached to side wall 14 of housing 12 and has a central opening through which end ring 55 and shaft 24 project.

Figure 2:
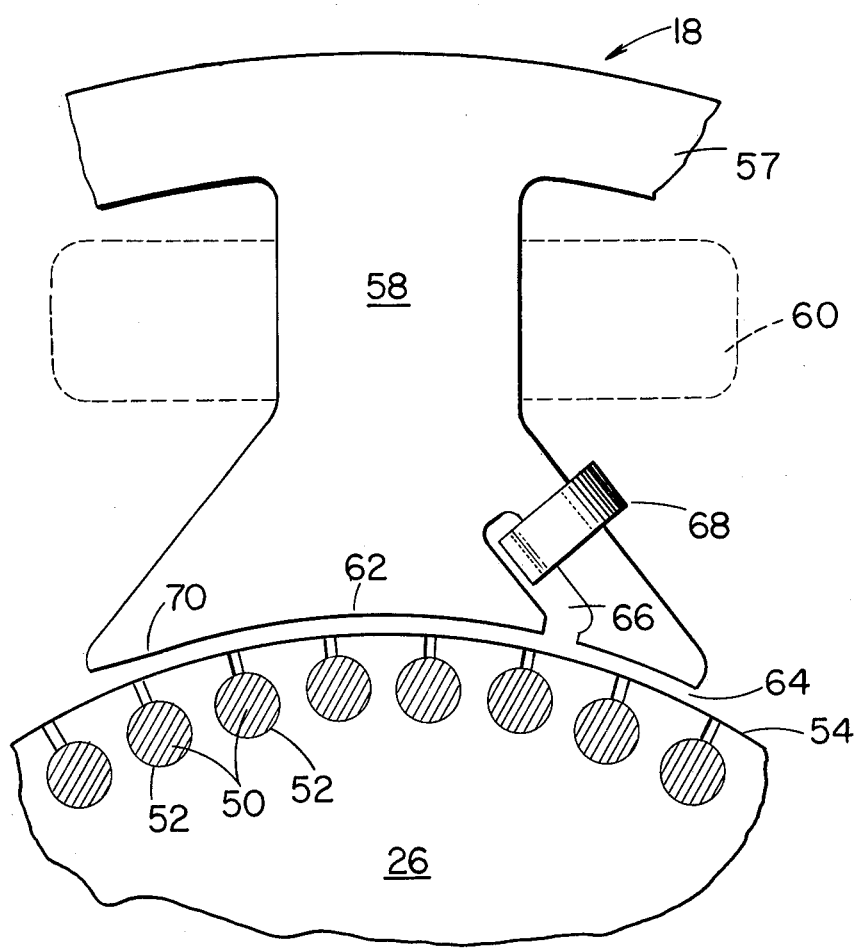
FIG. 2 is an enlarged view of one pole piece and a section of the rotor member of the motor of FIG. 1 showing the air gap therebetween.

Referring now additionally to FIG. 2, each of the pole pieces 58 has an arcuate pole face portion 62 defining a substantially uniform radial air gap 64 with cylindrical outer surface 54 of rotor member 26. Slot 66 communicates with pole face 62 and extends outwardly therefrom for accommodating shading coil 68. Each of the pole pieces 58 is also shown as having a chamfered pole face portion 70 as more fully shown and described in U.S. Pat. No. 2,773,999 to the present applicant, however, the chamfered pole face portion 70 is not an essential part of my present invention.

The shaded pole induction motor construction thus far shown and described is conventional.

Prior unit bearing fractional horsepower motor constructions known to the present applicant employed radial air gaps 64 having a width no less than 0.008 inch, and generally 0.009 or 0.010 inch or larger, for the reasons above described. In accordance with my invention, the width of air gaps 64 is less than about 0.006 inch, greater than about 0.001 inch, and preferably about 0.002 to 0.004 inch.

I have found that in the case of a shaded pole induction motor providing two watts output previously provided with a stator having a diameter of 3.2 inches and a width of 0.5 inch and a rotor having a diameter of 1.77 inch and having an air gap of about 0.009 inch, use of an air gap between 0.002 and 0.004 inch permits provision of a motor providing superior performance with The same two watts output with a stator having a diameter of 2.37 inches and a width of 0.42 inch and a rotor having a diameter of 1.139 inch. It will be seen my improved motor having an air gap between about 0.001 inch and about 0.006 inch has a ratio of air gap width to rotor diameter of about 0.0009 to about 0.005; while some prior motors have had air gaps in that range, they have employed air gaps much larger than 0.006 inch, i.e., 0.010 inch and larger. The difference in total material costs between the prior, larger motor, and the new, smaller motor incorporating the very small air gap of my invention is on the order of three to one.

Alternatively, use of the very small air gap of the invention permits the same motor which previously employed an air gap of conventional width to operate with substantially increased efficiency thus reducing power input and conserving energy.

While the invention has been illustrated and described in connection with a shaded pole motor, use of the very small air gaps of the invention is not limited to such motors and is equally applicable to other types of motors such as capacitor and polyphase motors.

While there have been described above the principles of this invention in connection with specific apparatus, it is to be clearly understood that this description is made only by way of example and not as a limitation to the scope of the invention.

What is claimed is:

1. In an electric motor having a stator core member with inwardly extending polar projections having inner ends defining a bore, and a rotor member rotatably mounted in said bore and having a peripheral surface defining radial air gaps with said inner ends, the improvement wherein said air gaps respectively have a radial width of from greater than about 0.001 inch to less than about 0.006 inch taken between said peripheral surface and said inner ends, the ratio of air gap width to rotor diameter being from greater than about 0.0009 to less than about 0.005.

2. The motor of claim 1 wherein said motor is a unit bearing, fractional horse power motor.

3. The motor of claim 2 wherein said air gaps, respectively, have a radial width of about 0.002 to 0.004 inch, said ratio being from about 0.0018 to about 0.0035.

4. The motor of claim 3 wherein said bearing is a sleeve bearing.

5. The motor of claim 4 wherein said polar projections are salient poles each having a pole face defining a respective air gap with said rotor member.

6. The motor of claim 5 wherein said motor is an alternating current induction motor having a squirrel cage rotor member.

7. The motor of claim 6 wherein said motor is a single phase, shaded pole motor.

* * * * *